United States Patent

[11] 3,607,974

| [72] | Inventors | Donald F. Holicky<br>Parma;<br>Kenneth G. Hahn, Brookpark; Robert C. Gasman, Parma, all of Ohio |
|---|---|---|
| [21] | Appl. No. | 798,461 |
| [22] | Filed | Feb. 11, 1969 |
| [45] | Patented | Sept. 21, 1971 |
| [73] | Assignee | SCM Corporation<br>Cleveland, Ohio |

[54] THERMOSETTING RESIN CONTAINING PENDANT UNSATURATION AND MONOMER WHERE MONOMER AND PENDENCY HAVE IDENTICAL FUNCTIONALITY
6 Claims, No Drawings

[52] U.S. Cl. ............................................... 260/836,
260/77.5 CR, 260/859 R, 260/875, 260/878 R, 260/883, 260/884, 260/885, 260/886
[51] Int. Cl. ........................................................ C08g 45/04,
C08g 41/04, C08f 15/00, C08f 19/00
[50] Field of Search............................................. 260/836,
859, 77.5 CR, 885, 883, 884, 886, 875, 878

[56] References Cited
UNITED STATES PATENTS

| 2,441,516 | 5/1946 | Snyder | 260/885 |
|---|---|---|---|
| 2,830,032 | 4/1958 | Siebel | 260/886 |
| 3,309,423 | 3/1967 | D'Alelio | 260/884 |
| 3,317,635 | 5/1967 | Osmond | 260/836 |
| 3,335,119 | 8/1967 | D'Alelio | 260/884 |
| 3,364,282 | 1/1968 | D'Alelio | 260/885 |
| 3,355,415 | 11/1967 | Worrall | 260/875 |
| 3,390,206 | 6/1968 | Thompson | 260/884 |
| 3,393,183 | 7/1968 | Hicks | 260/885 |
| 3,429,946 | 2/1969 | Verdol | 260/836 |
| 2,961,423 | 11/1960 | Chapin | 260/886 |
| 3,382,297 | 5/1968 | Thompson | 260/885 |
| 3,514,500 | 5/1970 | Osmond | 260/878 |
| 3,528,844 | 9/1970 | Burlant | 260/885 |
| 3,509,234 | 4/1970 | Burlant | 260/859 |

FOREIGN PATENTS

| 941,305 | 11/1963 | Great Britain | 260/875 |
|---|---|---|---|
| 1,365,607 | 5/1964 | France | 260/875 |

*Primary Examiner*—Paul Lieberman
*Attorneys*—Harold M. Baum, Merton H. Douthitt and Howard G. Bruss

ABSTRACT: Thermosettable resin compositions comprising: (1) a linear copolymer consisting of linear saturated ester-free backbone having pendant therefrom through linkage F, where F is selected from the group consisting of ester, ether, isocyanate, amine and amide, a plurality of etylenically unsaturated groups polymerizable with vinyl monomer for thermosetting purposes, and (2) a copolymerizabel ethylenically unsaturated monomer containing residues of a saturated compound having functionality F', where F' is selected from the group consisting of a saturated ester, ether, isocyanate, amine, and amide wherein, in said composition, F and F' are identical.

THERMOSETTING RESIN CONTAINING PENDANT UNSATURATION AND MONOMER WHERE MONOMER AND PENDENCY HAVE IDENTICAL FUNCTIONALITY

Thermosettable resin compositions falling within the scope of this invention are particularly advantageous since the copolymerizable monomer is formed in situ simultaneously with the reaction which links the plurality of ethylenically unsaturated groups to the linear copolymer backbone. The simultaneous synthesis of the copolymerizable monomer eliminates the expensive time-consuming step of solvent stripping prior to addition of the copolymerizable monomer.

The compositions of this invention form rigid products which have unusually high tensile strength and are exceptionally resistant to attack by organic solvents, acids and alkalies.

BACKGROUND OF THE INVENTION

Thermosettable polyester resin compositions are widely sold and used commercially. A great preponderance of such products comprise linear polyester resins dispersed a copolymerizable monomer, usually styrene or a substituted styrene. Linear polyester resins are the reaction products of unsaturated polycarboxylic acids and polyols and the linear polymer chains are formed through ester linkage contained in the linear backbone which has unsaturation functionality. Such resins are readily cured or thermoset by polymerization with the aforementioned copolymerizable monomer which cross-links the linear unsaturated polyester backbone at its unsaturation sites to form rigid products. Polyester resins, when thermoset, are often disadvantageous in that the ester linkages in the backbone are subject to hydrolysis and the backbone is sometimes broken, opening the polymer grid to additional chemical attack.

The thermosettable resin compositions of the present invention comprise, in part, a linear polymer in which the backbone is saturated and ester-free and is an addition polymer. The unsaturation through which cross-linking of the linear polymer is accomplished to obtain thermoset products is external to the backbone and is present as a plurality of pendant ethylenically unsaturated groups which are attached to the backbone through ester, ether, isocyanate, amine or amide linkage.

The liquid copolymerizable ethylenically unsaturated monomer in which the unsaturated linear polymer is dispersed is a monomer containing residues of ester, ether, isocyanate amine or amide, the residues in a particular composition being identical to the residues of the linkage through which the plurality of ethylenically unsaturated groups are attached to the linear polymer backbone.

Since the linear backbone of the linear copolymers of the thermosettable resin compositions of this invention is an addition polymer, it is possible to produce linear resins having significantly higher molecular weights than the molecular weights of conventional polyester resins. By way of example, the molecular weight of the linear polymers of the compositions of this invention is the range of from about 8,000 to about 225,000, whereas the molecular weight of high molecular weight linear polyester resins is about 5,000.

Thermoset products prepared from the thermosettable resin compositions falling within the scope of this invention have increased physical strength and increased solvent, acid, and alkali resistance over thermoset products prepared from conventional polyester resin compositions.

In the past, linear thermosettable resin compositions have been prepared by the free radical polymerization of one or more polymerizable monomers in an inert liquid diluent. This has usually been accomplished by dissolving or suspending the monomers in an inert liquid diluent, usually an inert organic solvent in the presence of a free-radical-producing catalyst. Such solvent was then stripped from the linear polymer after its polymerization through distillation at reduced pressure and the linear polymer was thereafter dispersed in the copolymerizable monomer by the addition of the monomer to the linear polymer.

While the high molecular weight linear copolymers falling within the scope of the thermosettable resin compositions of this invention can be prepared by the aforementioned conventional means, such polymers often tend, probably due to their high molecular weight, to gel during the stripping operation regardless of whether or not the linear resins contain conventional polymerization inhibitors. The thermosettable resin compositions of this invention are prepared by synthesizing the copolymerizable monomer in situ and simultaneously with the pendancy of the plurality of ethylenically unsaturated groups from the linear copolymer. Thus, for example, where the polymer backbone, prior to the pendancy of the ethylenically unsaturated groups therefrom contains hydroxyl functionality, an organic liquid diluent containing a saturated hydroxyl substituent will be employed as the diluent for the formation of the linear saturated ester-free backbone and as the plurality of ethylenically unsaturated groups are attached to the linear polymer backbone through esterification, the liquid diluent is converted into an ethylenically unsaturated ester monomer by the simultaneous reaction of the ethylenically unsaturated monomer with the hydroxyl groups on the linear polymer backbone and the liquid organic diluent.

On the other hand, where the linear saturated polymer backbone, prior to the pendancy of the plurality of ethylenically unsaturated groups, contains an isocyanate functionality, the organic diluent employed during the synthesis of the unsaturated linear polymer backbone will be a saturated isocyanate. During the pendancy of the plurality of ethylenically unsaturated urethane monomer and the plurality of ethylenically unsaturated groups will be attached to the linear polymer backbone through urethane linkage.

SUMMARY OF THE INVENTION

The present invention provides a thermosettable resin composition comprising:

A. a linear copolymer consisting of a saturated ester-free backbone having pendant therefrom through linkage F, where F is selected from the group consisting of residues of an ester, ether isocyanate, amine, and amide, a plurality of ethylenically unsaturated groups polymerizable with vinyl monomer for thermosetting purposes, and B. a liquid copolymerizable ethylenically unsaturated monomer containing residues of a saturated compound having functionality F', where F' is selected from the group consisting of a saturated ester, ether, isocyanate, amine, or amide and wherein, in said composition, F and F' are identical.

The resin compositions are advantageous in that they produce molded or shaped plastic products which have significantly greater tensile strength and unusually higher resistance to chemical attack by solvents, acids, and alkalies than shaped products obtained from commercially available polyester resins. The linear polymer backbone of the linear copolymer of the thermosettable resin compositions can contain residues of any of a wide variety of ethylenically unsaturated monomers. However, one of the monomers employed in the formation of the backbone must have a hydroxyl, oxirane, carboxyl, carboxylic acid anhydride, ether, isocyanate, amine or amide substituent in order to provide a plurality of pendant reaction sites for attachment of the pendant unsaturated groups external to the saturated polymer backbone. Thus, the backbone of the linear polymers forming a component of the thermosettable resin compositions of this invention contain prior to the addition of the pendant unsaturated groups external hydroxyl, oxirane, carboxyl, carboxylic acid anhydride, ester, ether, isocyanate, amine or amide substituents.

Monomers other than those containing the aforementioned substituents which can form the linear saturated ester-free polymeric backbone are those selected from the class consisting of ethylenically unsaturated substituted and unsubstituted hydrocarbons, ethylenically unsaturated esters of organic and inorganic acids, ethylenically unsaturated organic halides, and ethylenically unsaturated nitriles.

Ethylenically unsaturated hydrocarbons which can form a portion of the polymer backbone include aliphatic hydrocarbons, for example, ethylene, propylene, butylene, amylene, hexylene, heptylene, octylene, isoprene, and the like. Also included among the ethylenically unsaturated hydrocarbons are aromatic hydrocarbons, particularly vinyl and vinylidene hydrocarbons, including styrene, α-methyl styrene, vinyl toluene, etc., and their halo-substituted counterparts.

Ethylenically unsaturated esters of organic and inorganic acids which can form a part of the polymer backbone include esters of unsaturated carboxylic acids, for example, the alkyl acrylates such as ethyl acrylate, propyl acrylate, butyl acrylate, ethyl hexyl acrylate, and the corresponding methacrylates, etc. Also included are esters of ethylenically unsaturated alcohols of organic and inorganic acids, for example, vinyl acetate, vinyl butyrate, etc.

Ethylenically unsaturated aromatic halides which can form a portion of the halides which can polymer backbone include the aforementioned vinyl halides such as vinyl and vinylidene chloride, vinyl bromide, etc., and halo-substituted aromatic hydrocarbons, for example,, chloro styrene, bromo styrene, chloro methyl styrene, bromo methyl styrene, and the like.

Examples of ethylenically unsaturated nitriles which can form a portion of the backbone of the linear polymers of the thermosettable resin compositions of this invention include acrylonitrile, methacrylonitrile, crotonitrile, and the like.

The backbone of the polymers of the thermosettable resin compositions of this invention can contain at least one and sometimes more of the monomers falling within the above-mentioned classes. However, they must also contain at least one substituted ethylenically unsaturated monomer having the functional substituents hereinbefore defined.

The terms "functional monomer" and "functional substituents" as used herein are intended to mean and to refer to monomeric compounds or polymers containing hydroxyl, oxirane, carboxyl, carboxylic acid anhydride, isocyanate, ether, amine, or amide substituents.

The term "unsaturated functionality" as used herein is intended to mean and to refer to monomers having ethylenic unsaturation as well as the unsaturation of the plurality of the pendant groups attached to the linear saturated ester-free backbone.

Monomers which can be employed to form a portion of linear polymer backbones containing hydroxyl functionality (prior to the pendancy of the plurality of ethylenically unsaturated groups) include, for example, ethylenically unsaturated alcohols such as allyl, crotyl, αmethyl allyl, or βmethyl crotyl allyl alcohols and the like. Monomers other than ethylenically unsaturated alcohols which can be employed include hydroxy-substituted lower alkyl esters of an α,β-ethylenically unsaturated carboxylic acid. Advantageously, hydroxy lower alkyl esters containing from about two to about five carbon atoms in the alkyl group can be employed.

Although hydroxyalkyl esters of ethylenically unsaturated carboxylic acids can contain more than five carbon atoms in the alkyl group, employment of such esters is not usually advantageous and their use can sometimes be economically unfeasible. Both hydroxyalkyl esters of ethylenically unsaturated mono- and dicarboxylic acids can be suitably employed. Examples of esters of monocarboxylic acids include hydroxyalkyl esters of acrylic, crotonic, isocrotonic, vinyl acetic, methacrylic, tiglic, angelic, senecioic, teracrylic, hypogeic, oleic, elaidic, errucic, brassidic, and behenic. Of there, hydroxyethyl, hydroxypropyl, and hydroxybutyl esters of acrylic, vinyl acetic, and methacrylic acids are preferred for economic reasons. Examples of hydroxyalkyl esters of unsaturated dicarboxylic acids include esters of fumaric, maleic, glutaconic, citraconic, itaconic, ethidene malonic, mesaconic, allyl malonic, propylidene malonic, hydromuconic, pyrocinconic, allyl succinic, carbocaprolactonic, and teraconic acids. Of these, hydroxyethyl, hydroxypropyl, and hydroxybutyl diesters of maleic and itaconic acids are preferred because of the low cost and availability of these esters.

Hydroxy lower alkyl esters which have been found to provide particularly advantageous linear polymers are hydroxyethyl acrylate, hydroxypropyl acrylate, hydroxyethyl methacrylate, hydroxypropyl methacrylate, dihydroxyethyl fumarate, dihydroxypropyl fumarate, dihydroxyethyl maleate, and dihydroxypropyl maleate.

When such esters are copolymerized with vinyl monomers such as styrene, ethyl acrylate, methyl methacrylate, acrylonitrile, methacrylonitrile, or crotonitrile, a saturated linear ester-free addition polymer is formed consisting of a backbone containing a plurality of hydroxyl groups. Such a polymer is prepared in and dispersed in a hydroxy-substituted saturated organic compound, preferably an alcohol, and is an intermediate product in the preparation of the thermosettable resin compositions of this invention.

As will be evident hereinafter from the description and the specific example, the compositions are prepared by adding to the dispersion, containing the hydroxyl substituted saturated linear ester-free backbone dispersed in a hydroxy-substituted saturated organic liquid, an ethylenically unsaturated organic monomer capable of forming ester groups with the hydroxyl groups pendant from the backbone with the hydroxyl groups of the liquid diluent (e.g., the hydroxyl-substituted organic compound). Then all of the hydroxyl groups have become esterified, the resultant product is a thermosettable resin composition comprising a linear copolymer consisting of a saturated ester-free backbone having pendant therefrom through ester linkage a plurality of ethylenically unsaturated groups and the polymerizable monomer is an ethylenically unsaturated ester. If desirable additional vinyl monomer can be added to further reduce the concentration of linear polymer in the thermosettable resin composition.

As will be evident to those skilled in the art, a wide variety of ethylenically unsaturated monomers capable of forming ester groups with the pendant hydroxyl groups on the polymer backbone and with the hydroxyl groups of the liquid diluent can be employed to form the compositions of this invention. Such ethylenically unsaturated compounds include ethylenically unsaturated carboxylic acids, ethylenically unsaturated dicarboxylic acid anhydrides, and ethylenically unsaturated acyl halides, and the like.

Examples of ethylenically unsaturated carboxylic acids include those of the acrylic series hereinbefore described.

Examples of ethylenically unsaturated carboxylic anhydrides include maleic and itaconic anhydrides.

Examples of unsaturated acyl halides include acryloyl chloride or bromide, methacrylyl chloride or bromide, and crotyl chloride or bromide.

The thermosettable resin compositions of this invention are conventionally stabilized through the addition of known inhibitors such as, for example, hydroquinone, to prevent them from cross-linking and can be readily cross-linked by the addition of a conventional free radical polymerization catalyst.

Thermosettable resin compositions wherein the linear backbone, prior to the addition of the plurality of ethylenically unsaturated groups thereto, contains a plurality of pendant oxirane groups are the addition polymers of any of the aforementioned ethylenically unsaturated monomers plus an ethylenically unsaturated glycidyl compound such as, for example, glycidyl acrylate, glycidyl methacrylate, allyl glycidyl ether, and monglycidyl maleate. The diluent in which this linear polymer is prepared is a saturated-oxirane-containing compound such as, for example, glycidol, stryene oxide, propylene oxide, etc.

In this instance, the plurality of ethylenically unsaturated groups are the residues of α,β-ethylenically unsaturated substituted and unsubstituted carboxylic acids and the copolymerizable monomer is the ethylenically unsaturated ester formed by the reaction of the ethylenically unsaturated carboxylic acid and the oxirane compound.

Thermosettable resin compositions, wherein the linear backbone, prior to the addition of the plurality of ethylenically unsaturated groups thereto, contains a plurality of pendant dicarboxylic acid anhydride groups are the addition polymers of any of the aforementioned ethylenically unsaturated monomers plus an ethylenically unsaturated dicarboxylic acid anhydride such as, for example, maleic or itaconic anhydride, and the reactive diluent will be a saturated acid anhydride, for example, phthalic anhydride, succinic anhydride, hexahydrophthalic anhydride, dodecenyl succinic anhydride, and the like.

The plurality of ethylenically unsaturated groups are residues of hydroxyl-substituted ethylenically unsaturated compounds such as, for example, any of the ethylenically unsaturated alcohols hereinbefore described or the residues of hydroxyl-substituted lower alkyl esters of $\alpha,\beta$-ethylenically unsaturated carboxylic acids. The plurality of ethylenically unsaturated groups are pendant from the backbone through ester or acyl linkage and the copolymerizable monomer (sometimes called the reactive diluent) is the ester formed by the reaction of the hydroxyl-substituted ethylenically unsaturated compound with the acid anhydride diluent.

Where the thermosettable resin compositions are composed of a saturated linear ester-free backbone having a plurality of ethylenically unsaturated groups pendant therefrom through urethane linkage, the backbone, prior to the pendancy of the ethylenically unsaturated groups thereto, will comprise the linear addition copolymer of one or more of the aforementioned monomers in addition to an ethylenically unsaturated isocyanate and is dispersed in a diluent consisting essentially of a liquid-saturated isocyanate. Examples of ethylenically unsaturated isocyanates which can be employed to form a portion of the polymer backbone include, for example, allyl isocyanate, isopropenyl isocyanate, 4-isocyanato styrene, vinyl napthalene isocyanate, 5-isocyanato pentene-1, and the like.

Other unsaturated isocyanates are isocyanate esters of $\alpha,\beta$-ethylenically unsaturated carboxylic acids and include bis-(2-isocyanato-ethyl) fumarate, bis-(2-isocyanato-ethyl) maleate, isocyanato ethyl acrylate, isocyanato propyl methacrylate, 1-methyl benzene-2-isocyanato-4-carbamic ester propyl methacrylate, bis-(2-isocyanato-1-methyl benzene-4-carbamic ester propyl) maleate and the corresponding fumarate esters and the like. The three last-mentioned esters are unsaturated urethane esters having terminal isocyanate groups.

Such linear polymers are prepared in a liquid-saturated isocyanate, examples of which include toluene diisocyanate, xylene diisocyanate, cyclohexane diisocyanate, hexamethalene diisocyanate, isofuran diisocyanate, lysine diisocyanate, phenyl isocyanate, and 4,4'-isocyanato diphenyl methane, etc. The resulting polymer is a saturated linear ester-free addition polymer having a plurality of isocyanate groups dispersed in a liquid saturated isocyanate. The plurality of ethylenically unsaturated groups are appended to the backbone by adding to the dispersion an unsaturated hydroxy-substituted compound such as one of the hydroxy-substituted ethylenically unsaturated compounds hereinbefore described. During the addition of the hydroxyl-substituted compounds, two simultaneous reactions take place, one in which the hydroxyl groups of the hydroxy-substituted compounds react with the isocyanate groups of the liquid-saturated isocyanate. There is thus formed a thermosettable resin composition comprising a linear copolymer consisting essentially of a saturated ester-free backbone having pendant therefrom through urethane linkage a plurality of ethylenically unsaturated groups, the polymer being dispersed in an ethylenically unsaturated urethane formed by the reaction of the hydroxyl-substituted ethylenically unsaturated compound with the saturated isocyanate.

Polymers similar to those saturated above in that they have a plurality of ethylenically unsaturated groups which are pendant from the backbone through urethane linkage can also be prepared from linear polymer backbones which have prior to the pendency of the unsaturated groups a plurality of hydroxyl groups. In this instance, the diluent will be an inert alcohol and the unsaturated polymer is formed by adding to a dispersion containing the hydroxyl-substituted polymer and hydroxyl-substituted saturated liquid an unsaturated isocyanate of the type hereinbefore described.

Thermosettable resin compositions containing a saturated linear backbone having pendant therefrom through ether linkage and dispersed in an ethylenically unsaturated ether are prepared by forming a backbone having a pendant ether, hydroxyl, or oxirane group.

Thereafter, the plurality if ethylenically unsaturated groups are attached to the backbone while simultaneously forming the ethylenically unsaturated ether diluent (e.g., the copolymerizable monomer). Where the backbone, prior to the attachment of the plurality of ethylenically unsaturated groups, contains a pendant ether substituent the thermosettable resin composition is prepared by a transetherification reaction. The backbone is formed by polymerizing one of more of the hereinafter referred to ethylenically unsaturated monomers and an ethylenically unsaturated ether, for example, a lower alkyl vinyl ether such as methyl vinyl ether, ethyl vinyl ether, propyl vinyl ether, butyl vinyl ether, pentyl vinyl ether, allyl vinyl ether, phenyl vinyl ether, styrene ortho-allyl ether, styrene para-allyl ether, and the like and the saturated linear polymer backbone will be polymerized in a saturated ether. The transetherification reaction can be readily accomplished by heating a substantially stoichiometric quantity of a hydroxy-substituted ethylenically unsaturated compound such as those hereinbefore described in the presence of an acidic catalyst such as, for example, a Lewis acid catalyst. The saturated ether diluent can be any of a wide variety of ethers such as the dimethyl ether of ethylene glycol, the dimethyl ether of propylene glycol, and the like. The transetherification reaction results in the formation of an alcohol which can readily be removed by vacuum distillation. Resin compositions containing the plurality of ethylenically unsaturated groups can also be prepared from a saturated linear polymer backbone containing prior to the attachment of the ethylenically unsaturated groups a plurality of pendant oxirane substituents. Such a backbone is prepared by reacting one or more of the ethylenically unsaturated monomers hereinbefore described and an ethylenically unsaturated glycidyl compound, for example, glycidyl acrylate, glycidyl methacrylate, allyl glycidyl ether, and the like, and the plurality of pendant unsaturated groups will be residues of ethylenically unsaturated hydroxyl compounds. The liquid diluent, prior to the pendancy of the ethylenically unsaturated groups, is a saturated-oxirane-containing compound and is converted to a copolymerizable vinyl monomer simultaneously with the pendancy of the plurality of ethylenically unsaturated groups by virtue of the reaction of the hydroxy-substituted ethylenically unsaturated compound with the oxirane groups pendant from the backbone and the oxirane groups of the liquid diluent.

Conversely, thermosettable resin compositions can be prepared by forming a backbone containing a plurality of pendant hydroxyl groups as hereinbefore described dispersed in a saturated alcohol and adding to such mixture any of the ethylenically unsaturated glycidyl (oxirane-containing) compounds hereinbefore described. The final composition is composed of a linear polymer in which the plurality of pendant ethylenically unsaturated groups are residues of glycidyl compounds and are pendant through the backbone through ether linkage and the copolymerizable monomer is an ethylenically unsaturated ether, the reaction product of the saturated alcohol and the ethylenically unsaturated glycidyl compound.

The present invention also provides thermosettable resin compositions comprising a polymer consisting of a linear saturated ester-free backbone having pendant therefrom through amine linkage a plurality of ethylenically unsaturated groups dispersed in an ethylenically unsaturated amine.

The saturated linear backbone is prepared by reacting at least one of the polymerizable monomers hereinbefore described and an ethylenically unsaturated amine containing at least one hydrogen atom such as, for example, n-methyl amino methacrylate, n-methyl allyl amine, n-ethyl amino ethyl amino acrylate, n-propyl amino ethyl hexyl acrylate, etc. The resultant linear polymer is saturated, ester-free and contains a plurality of amine groups external to the backbone and is dispersed in a liquid diluent which is a saturated amine such as, for example, diethyl amine, dipropyl amine, dibutyl amine, etc. The plurality of ethylenically unsaturated groups which can be appended to the backbone include residues of ethylenically unsaturated isocyanates and esters of isocyanates, ethylenically unsaturated halides, and ethylenically unsaturated glycidyl compounds, the ethylenically unsaturated isocyanates, ethylenically unsaturated halides, and ethylenically unsaturated glycidyls being those hereinbefore described. These ethylenically unsaturated compounds simultaneously react with the amine groups pendant from the linear polymer backbone and the amine groups of the diluent form one embodiment of the thermosettable resin compositions of this invention. The linear backbone containing the plurality of pendant amine groups can also be made ethylenically unsaturated by adding to the dispersion ethylenically unsaturated acyl halides, for example, acryloyl and methacrylyl halides and the like.

Also, saturated polymer backbones containing a plurality of amine groups can be converted into unsaturated linear polymers by adding ethylenically unsaturated glycidyl compounds such as those hereinbefore described. In this instance, the ethylenically unsaturated acyl halides and the ethylenically unsaturated glycidyl compounds simultaneously react with the saturated amine diluent to form an ethylenically unsaturated linear copolymer dispersed in a copolymerizable monomer.

Where the saturated polymer backbone contains pendant amine groups, the organic liquid diluent is a saturated amine and ethylenically unsaturated isocyanates are employed to provide unsaturation, the plurality of pendant unsaturated groups are linked to the backbone through amide (carbamide) linkage and the copolymerizable monomer is an ethylenically unsaturated carbamide.

Where the backbone contains pendant isocyanates, the organic diluent is a saturated isocyanate. The same linkage is obtained by reacting an unsaturated amine simultaneously with the isocyanate groups of the polymer backbone and the saturated isocyanate organic diluent.

The present invention also provides a class of thermosettable resin compositions comprising a linear copolymer consisting of a saturated ester-free backbone having pendant therefrom through amide linkage a plurality of ethylenically unsaturated groups and where the copolymer is dispersed in a liquid ethylenically unsaturated amide. The saturated linear ester-free backbone can be readily prepared by reacting at least one of the primary monomers and an ethylenically unsaturated amide such as, for example, acrylamide, methacrylamide, para-vinyl benzamide, ortho-vinyl benzamide, meta-vinyl benzamide, crotoamide, and the like.

The saturated linear backbone will be dispersed in a saturated liquid amide such as, for example, formamide, acetamide, and the like. To this dispersion, there is added any of the ethylenically unsaturated glycidyl compounds hereinbefore described. Such glycidyl compounds simultaneously react with the plurality of amide groups pendant from the backbone and with the amide groups of the liquid diluent to form an embodiment of the thermosettable resin compositions of this invention wherein the linear backbone contains a plurality of ethylenically unsaturated groups linked thereto through amide linkage and the linear polymer is dispersed in an ethylenically unsaturated amide.

One advantageous embodiment of the thermosettable resin compositions of this invention comprises a linear copolymer consisting of a saturated ester-free backbone having pendant therefrom through ester linkage a plurality of ethylenically unsaturated groups and a liquid copolymerizable ethylenically unsaturated ester. This embodiment comprises the addition polymer of from about 50 to about 70 weight percent of a vinyl aromatic hydrocarbon such as, for example, styrene, α-methyl styrene, chloro methyl styrene, vinyl toluene, or the like, and from about 30 to about 50 weight percent of a hydroxy lower alkyl ester of an ethylenically unsaturated carboxylic acid, for example, hydroxyethyl or hydroxypropyl acrylate, hydroxyethyl or hydroxypropyl methacrylate, di(hydroxyethyl) or di(hydroxypropyl) maleate and the backbone polymer is polymerized in a saturated aliphatic alcohol, for example, butanol. The plurality of pendant unsaturated groups are ethylenically unsaturated carboxylic acid residues which are linked to the backbone through ester linkage and the liquid copolymerizable monomer is the butyl ester of the ethylenically unsaturated carboxylic acid.

Another such advantageous thermosettable resin composition is one wherein the polymer backbone contains from about 50 to about 70 weight percent of vinyl aromatic hydrocarbon, from about 20 to about 10 weight percent of an unsaturated nitrile such as, for example, acrylonitrile or methacrylonitrile, and from about 30 to about 20 weight percent of a hydroxy lower alkyl ester of an ethylenically unsaturated carboxylic acid hereinbefore described. The backbone is polymerized in a saturated lower aliphatic alcohol such as, for example, n-butanol and the pendant unsaturated groups are ethylenically unsaturated carboxylic acid residues which are attached to the backbone through ester linkage. The unsaturated polymer is dispersed in the butyl ester of the ethylenically unsaturated carboxylic acid.

Another embodiment of this invention is one in which the plurality of ethylenically unsaturated groups are pendant from the polymer through urethane linkage and the copolymerizable monomer is an ethylenically unsaturated urethane. In this embodiment, the backbone comprises an addition polymer from about 70 to about 90 weight percent of a vinyl aromatic hydrocarbon and from about 30 to about 10 weight percent of an ethylenically unsaturated isocyanate.

The backbone polymers are prepared in a liquid organic diluent consisting essentially of a saturated isocyanate. In these resin compositions, the plurality of pendant ethylenically unsaturated groups are residues of ethylenically unsaturated hydroxyl compounds which have been reacted with the pendant isocyanate to form urethane linkage. The unsaturated polymers are dispersed in an ethylenically unsaturated urethane monomer which is the reaction product of the isocyanate and the ethylenically unsaturated hydroxyl compound.

Another embodiment is one wherein the backbone is the addition polymer of from about 80 to 10 weight percent of a vinyl aromatic hydrocarbon, from about 10 to about 60 weight percent of an alkyl acrylate, for example, ethyl acrylate, methyl acrylate, propyl acrylate, ethyl hexyl acrylate, methyl methacrylate, ethyl methacrylate, etc., and from about 10 to about 30 weight percent of an ethylenically unsaturated isocyanate. The polymer is prepared in a liquid diluent consisting essentially of a saturated isocyanate as hereinbefore described. In these compositions, the plurality of ethylenically unsaturated groups which are attached to the backbone are residues of ethylenically unsaturated hydroxyl compounds which have reacted with the isocyanate to form the urethane linkage. The copolymerizable monomer is an ethylenically unsaturated urethane which is the reaction product of the saturated isocyanate and the ethylenically unsaturated hydroxyl-substituted compound.

Another embodiment of this invention is one comprising a thermosettable resin wherein the linear polymer backbone consists of a saturated ester-free backbone having pendant therefrom through ether linkage a plurality of ethylenically unsaturated groups and a liquid copolymerizable monomer consisting of an ethylenically unsaturated ether. In such embodiment, the backbone is the addition polymer of from about 40 to about 90 weight percent of a vinyl aromatic hydrocarbon, from about 5 to about 20 weight percent of an ethylenically unsaturated nitrile, and from about 5 to about 40 weight percent of a hydroxy substituted ethylenically unsaturated compound. The polymer is dispersed in a saturated hydroxy-substituted organic liquid, preferably a lower aliphatic alcohol, such as, for example, butanol. The plurality of ethylenically unsaturated groups pendant from the backbone are residues of ethylenically unsaturated-oxirane-containing compounds and the copolymerizable monomer is an ether formed by the reaction of the ethylenically unsaturated oxirane compound and the saturated hydroxyl substituted organic liquid.

Still another advantageous embodiment of the compositions of this invention comprises a linear copolymer consisting of a saturated ester-free backbone having pendant therefrom through amine linkage a plurality of ethylenically unsaturated groups dispersed in a liquid copolymerizable ethylenically unsaturated amine. This embodiment comprises the addition polymer of from about 55 to 90 weight percent of a vinyl aromatic hydrocarbon, from about 5 to about 25 weight percent of an ethylenically unsaturated nitrile, and from about 5 to about 20 weight percent of an ethylenically unsaturated amine containing at least one hydrogen atom (e.g., a primary or secondary amine such as, for example, methallyl amine or allyl amine). The linear saturated ester-free backbone has prior to the attachment of the plurality of ethylenically unsaturated groups pendant amino nitrogen groups containing at least one hydrogen atom. The linear polymer prior to the attachment of ethylenically unsaturated groups is dispersed in a saturated amine such as, for example, butyl amine. The plurality of pendant unsaturated groups are residues of ethylenically unsaturated-oxirane-containing compounds and the copolymerizable monomer is an ethylenically unsaturated amine, the reaction product of the saturated amine and the ethylenically unsaturated oxirane compound.

Another embodiment of this invention comprises a linear saturated ester-free backbone dispersed in a saturated amine prior to the attachment of the plurality of ethylenically unsaturated groups to the backbone. The plurality of ethylenically unsaturated groups are residues of ethylenically unsaturated isocyanates which are linked to the backbone through amine (carbamide) linkage, and the copolymerizable monomer is an ethylenically unsaturated carbamide, the reaction product of the ethylenically unsaturated isocyanate and the saturated amine.

Another advantageous embodiment of the compositions of this invention comprises a linear copolymer consisting of a saturated ester-free backbone having pendant therefrom through amide linkage a plurality of ethylenically unsaturated groups. This embodiment comprises a linear addition polymer of from about 60 to about 90 weight percent of a vinyl aromatic hydrocarbon, for example, styrene; from about 5 to about 20 weight percent of an unsaturated nitrile, and from about 5 to about 20 weight percent of an ethylenically unsaturated amide, for example, acrylamide, crotonamide, methacrylamide, etc. The product obtained is a linear saturated ester-free backbone having pendant amide and is polymerized in a liquid-saturated amide such as, for example, formamide. The plurality of ethylenically unsaturated groups are residues of an ethylenically unsaturated aldehyde, for example, crotonaldehyde example, the copolymerizable monomer is an ethylenically unsaturated amide, the reaction product of the saturated amide and the ethylenically unsaturated aldehyde. As will be evident to one skilled in the art, a wide variety of thermosettable resin compositions containing the linear backbone having pendant therefrom a plurality of ethylenically unsaturated groups wherein the polymer is dispersed in a simultaneously formed copolymerizable ethylenically unsaturated (vinyl) monomer can be prepared without the necessity of subjecting the polymer to polymerization during the solvent-stripping steps acquired by the prior art processes and products. If desirable, for economic reasons, additional vinyl monomer such as, for example, styrene, or similar monomer may be added to the thermosettable resin compositions which, when thermoset, will have the advantageous properties hereinbefore described.

The above compositions are stabilized, that is, prevented from polymerization during storage by the addition of small amounts (e.g., from about 0.005 percent to about 1.0 percent) of a conventional polymerization inhibitor such as hydroquinone methyl ether, etc. The thermosettable compositions can be readily converted to rigid shaped products by the addition of a free radical polymerization catalyst, for example, inorganic per compound such as benzoyl peroxide, lauroyl peroxide, cumen hydroperoxide, etc.

The present invention further provides a process for preparing the thermosettable resin compositions of this invention which comprises:

A. forming a reaction mixture consisting of:
   1. a liquid organic diluent selected from the class consisting of saturated alcohols, oxiranes, ethers, carboxylic acids, isocyanates, amines, and amides,
   2. at least one monomer selected from the group consisting of:
      a. ethylenically unsaturated substituted and unsubstituted hydrocarbons,
      b. ethylenically unsaturated esters of organic and inorganic acids,
      c. ethylenically unsaturated organic halides,
      d. ethylenically unsaturated nitriles,
   3. a monomer selected from the group consisting of:
      a. an ethylenically unsaturated hydroxyl substituted compound,
      b. an ethylenically unsaturated oxirane,
      c. an ethylenically unsaturated ether,
      d. an ethylenically unsaturated isocyanate,
      e. an ethylenically unsaturated amine having one hydrogen atom,
      f. an ethylenically unsaturated amide,
      g. an ethylenically unsaturated halide, and
      h. an ethylenically unsaturated carboxylic acid wherein the ethylenically unsaturated monomer has identical chemical functionality with the functionality of the liquid organic diluent;
   4. a free radical catalyst;

B. heating said mixture with agitation in an inert atmosphere and for a time sufficient to form a linear saturated ester-free addition polymer containing polar functionality external to said backbone, said polar functionality being selected from the class consisting of hydroxyl, carboxyl, ether, oxirane, isocyanate, amine, amide, and halide functionality, said polymer being dispersed in a liquid saturated organic diluent having identical substituent functionality to that of the external functionality of said backbone;

C. adding to the dispersion so formed:
   1. when said backbone contains hydroxyl functionality, an ethylenically unsaturated monomer selected from the class consisting of ethylenically unsaturated carboxylic acid anhydrides, ethylenically unsaturated isocyanates and ethylenically unsaturated oxirane compounds in an amount sufficient to react with substantially all of the substituents external to the backbone and with functional substituents of the organic diluent,
   2. when said backbone contains oxirane functionality, an ethylenically unsaturated monomer selected from the group consisting of an ethylenically unsaturated hydroxy compound and ethylenically unsaturated carboxylic acid, and ethylenically unsaturated amine, and an ethylenically unsaturated amide in an amount sufficient to react with substantially all of the substituents pendant from the backbone and with the functional substituents of the organic diluent,
   3 when said backbone contains ethereal functionality, a hydroxy-substituted ethylenically unsaturated compound in an amount sufficient for said hydroxyl-substituted compound to undergo transetherification with substantially all of said ether groups pendant from said backbone and with substantially all of the ether groups of the organic diluent,
   4. when said backbone contains amine functionality, an ethylenically unsaturated monomer selected from the group consisting of an ethylenically unsaturated isocyanate, an ethylenically unsaturated hydroxyl compound, and an ethylenically unsaturated oxirane in an amount sufficient to react with substantially all of the amine substituents on said backbone and with substantially all of the amine groups in said liquid organic diluent, 5. when said backbone contains amide functionality, an ethylenically unsaturated monomer selected from the group consisting of an ethylenically unsaturated aldehyde and an ethylenically unsaturated oxirane in an amount sufficient to react with substantially all of the amide substituents on said backbone and in said liquid organic diluent;

D. Heating the resultant mixture at a temperature and for a time sufficient to form a linear copolymer having a substantially inert backbone and having pendant therefrom a plurality of ethylenically unsaturated groups, the linear polymer being dispersed in a copolymerizable ethylenically unsaturated monomer having the same functional linkage as that of the linkage of the plurality of ethylenically unsaturated groups to the linear polymer backbone.

It has been found possible to prepare thermosettable resin compositions containing a variety of high molecular weight polymers dispersed in copolymerizable monomers which, when made thermoset by cross-linking of the linear polymer under conditions of free radical catalysis, produce rigid structures having the improved properties hereinbefore described.

As will be evident from the specific examples, the above-described process in which the linear polymeric backbone is prepared is a conventional one using well-known addition polymerization techniques. However, a significant portion of the monomers employed in the formation of the backbone contain hydroxyl, carboxyl, oxirane, ether, isocyanate, halogen, amine, or amide functionality to provide reaction sites for attaching or linking the plurality of ethylenically unsaturated groups to the backbone of the linear copolymer. Polymerization of the addition polymer backbone is carried out in a liquid organic diluent at temperatures in the range of between about 180° to about 300° F. When the monomers employed to form the plurality of ethylenically unsaturated groups are liquid, the polymerization is conducted at substantially atmospheric pressure under vapor phase (e.g., reflux) conditions. Where one or more of the monomers are gaseous (such as, for example, methyl vinyl ether), polymerization is conducted at superatmospheric pressures from between about 100 to about 300 p.s.i.g., at temperatures within the above-mentioned ranges.

As previously noted and as will be evident from the specific examples, the polymerization is conducted in a liquid organic diluent which is a liquid-saturated compound having the same functional substituents as the functional substituents pendant from the backbone prior to the addition of the plurality of ethylenically unsaturated groups thereto. By way of example, where the backbone, prior to the addition of the plurality of ethylenically unsaturated groups thereto has hydroxyl functionality, the liquid diluent will be saturated hydroxyl-substituted organic compound and the ethylenically unsaturated monomer which will form the plurality of ethylenically unsaturated groups pendant from the backbone will be a monomer which will be reactable with the functionality (e.g., hydroxyl) of the backbone and that of the liquid diluent and will be an ethylenically unsaturated carboxylic acid anhydride, and ethylenically unsaturated oxirane, and an ethylenically unsaturated isocyanate such as those hereinbefore described.

The following specific examples are intended to illustrate the invention but not to limit the scope thereof, parts and percentages being by weight unless otherwise specified.

EXAMPLE 1

The following examples 1, 2, and 3 illustrate a thermosettable resin composition comprising a saturated linear ester-free polymer having pendant therefrom through ester linkage a plurality of ethylenically unsaturated groups wherein the linear copolymer is dispersed in an ethylenically unsaturated ester.

To dihydroxypropyl reaction vessel, there was added 400 grams of ethylene glycol monoethyl ether.

To a separate container, there was mixed 220 grams of styrene, 60 grams of acrylonitrile, 120 grams of dihydroxypropyl maleate and 4 grams of benzoyl peroxide. This mixture was charged into the reactor over a period of 2 hours under continuous agitation while the contents of the reactor were maintained at 185° F. The contents of the reaction vessel were held under the nitrogen sparge, continuously agitated, and maintained at 185° F. for 10 hours until polymerization had been completed. A portion of the sample was withdrawn and the average molecular weight, determined by gel phase chromatography, was found to be 85,000. The thermoplastic polymer was a linear saturated ester-free terpolymer having pendant hydroxyl groups.

The of the contents of the reaction vessel was increased to 225° F. and thereafter while the nitrogen sparged and agitation was continued, 518.4 grams of maleic anhydride and a small amount of lithium carbonate were added over a period of about 60 seconds, then 308.4 grams of propylene oxide were added while the contents of the reaction vessel were maintained at a reflux temperature of 250° F. using adequate cooling means to prevent oxide loss. The resulting product was a linear polymer consisting of a saturated ester-free backbone having pendant therefrom through ester linkage with the hydroxyl groups, a plurality of hydroxypropyl maleate groups dispersed in ethylene glycol monoethyl ether hydroxypropyl maleate.

The contents of the reaction vessel were increased to 280° F. and 16.3 grams of piperidene, an isomerization catalyst, were added. The contents were agitated and held for 4 hours at this temperature after which the contents of the reaction vessel were cooled to 240° F. and consisted essentially of the linear polymeric backbone on which pendant maleic acid groups attached through ester linkages had been converted to fumarate groups. The reaction mixture was then cooled to 240° F. and 0.34 grams of hydroquinone were dispersed over a 5-minute period with agitation. The resulting polymer solution was then reduced in 696 grams of styrene. The resulting product consisted of a linear thermoplastic polymer having engrafted thereon through ester linkage a plurality of hydroxypropyl fumarate groups. The average molecular weight of the polymer, determined by gel phase chromatography, was found to be 100,000. A cured film was prepared using the procedure of example 1 and set aside for evaluation as described in example 10.

EXAMPLE 2

The procedure of example 1 was repeated except that the propylene oxide was added to the fumarate after it had been isomerized with the piperidene. The average molecular weight of the polymer, determined by gel phase chromatography, was found to be 100,000.

EXAMPLE 3

The procedure of example 1 was repeated except that 100 grams of styrene, 100 grams of methyl methacrylate and 200 grams of dihydroxypropyl maleate were employed in place of the 220 grams of styrene, 60 grams of acrylonitrile, and 20 grams of dihydroxypropyl maleate employed in that example. The resulting product consisted of a linear thermoplastic polymer having engrafted thereon through ester linkage a plurality of hydroxypropyl fumarate groups. The polymer was reduced with styrene to 50 percent solids and a portion of the polymer poured between glass plates and cured using a free radical polymerization catalyst. The resultant cured film was set aside for further evaluation as described in example 9. The average molecular weight of the polymer, determined by gel phase chromatography, was found to be 100,000.

The following examples 4, 5, and 6 illustrate a thermosettable resin composition comprising a saturated linear ester-free monomer having pendant therefrom through urethane linkage a plurality of ethylenically unsaturated groups where the polymer is dispersed in an ethylenically unsaturated urethane.

EXAMPLE 4

To a 5-liter reaction vessel of example 1, there was added 170 grams of phenyl isocyanate. Thereafter, the temperature of the phenyl isocyanate was raised to 215° F. and there was added under a blanket of nitrogen a mixture of 260 grams styrene, 80 grams methacrylonitrile, and 9 grams benzoyl peroxide. Simultaneously through a separate funnel, there was introduced 52 grams of allyl isocyanate which had been previously dispersed in 170 grams of phenyl isocyanate. The addition was carried out over a 4-hour period during which time the contents of the reactor were continuously agitated and nitrogen gas was continuously sparged through the reactor. Finally, the product was reduced in 690 grams of styrene containing 0.3 grams of quinone. The contents of the reaction vessel comprised a reaction mixture containing the above-described components and was held at 250° F. for an additional 6-hour period following the completion of the addition of the components to the reaction vessel. There was thus formed a substantially linear saturated ester-free backbone containing a plurality of reactive isocyanate groups pendant therefrom, dispersed in phenyl isocyanate. The reactor was then cooled to 130° F. and 202 grams of allyl alcohol were added over a period of 4 hours. By so proceeding, there was formed a linear ester-free saturated backbone having pendant therefrom a plurality of unsaturated groups linked to the backbone through urethane linkage. The linear polymer was dispersed in the allyl alcohol adduct of phenyl isocyanate which consisted essentially of an unsaturated copolymerizable urethane monomer to which 0.1 gram of quinone was added to prevent premature cross-linking. The polymer had an average molecular weight of approximately 25,000 as determined by gel phase chromatographic techniques.

The polymer was converted to a thermoset film using the procedure described in example 1 and the film was set aside for further evaluation as described in example 10.

EXAMPLE 5

To the reaction vessel of example 1, there was added 341 grams of toluene diisocyanate. Thereafter, while nitrogen was continuously sparged through the reactor and while the contents were continuously agitated, there was added a mixture of 520 grams styrene, 160 grams methacrylonitrile, and 18 grams benzoyl peroxide. Simultaneously through a separate funnel, there was introduced a solution consisting essentially of 340 grams of toluene diisocyanate and 216 grams of 1-methyl benzene-2-isocyanato-4-carbamic ester propyl methacrylate. The last-mentioned compound was the hydroxypropyl methacrylate mono adduct of toluene diisocyanate. The reactants were added to the reaction vessel over a 4-hour period while the nitrogen gas sparge and agitation was continuously maintained. The resulting mixture was held at 250° F. for an additional 6 hours after all of the components had been added to the reaction vessel. Finally, the product was reduced in styrene, 1,380 grams, containing 0.6 grams of quinone. There was then added to the mixture 0.6 grams of quinone. Thereafter, the temperature of the contents of the reactor was raised to 140° F., and 1,466 grams of hydroxypropyl methacrylate were added to the mixture over 4 hours. Also, during this addition, the nitrogen sparge and agitation were maintained. The heating was continued for 5 hours and the product obtained consisted substantially of a linear polymer having the above-mentioned backbone and a plurality of ethylenically unsaturated groups pendant from the backbone, each through a distal urethane linkage and a proximal ester linkage. The polymer had an average molecular weight of approximately 25,000 as determined by gel phase chromatographic techniques. The polymer was dispersed in the bis-hydroxypropyl methacrylate adduct of toluene diisocyanate. A 100-gram sample of the above material was poured between two glass plates after the addition of 1 gram of benzoyl peroxide and cured at 200° F. to form a thermoset film which was set aside for further evaluation as described in example 10.

EXAMPLE 6

The procedure of example employed 5 was repeated except that isopropenyl isocyanate was employed instead of the acrylic isocyanate used in that example. A liquid product visually similar to that obtained in example 1 was produced. A thermoset film was also made from this product using the procedure described in example 1 and this film was set aside for evaluation as described in example 10.

EXAMPLE 7

Example 7 illustrates a thermosettable resin composition where the ethylenically unsaturated groups are attached to the polymer backbone through ether linkage and the polymer is dispersed in an ethylenically unsaturated ether.

To a 1-gallon pressure autoclave equipped with a thermometer, a gas inlet valve, heating and cooling coils, mechanical agitator, and inlet funnels for introducing inert gas and reactants, there is added 1,000 grams of glycidol. Into a separate container, there is mixed under a blanket of nitrogen, 800 grams of styrene, 150 grams of methacrylonitrile, and 10 grams of benzoyl peroxide. Fifty grams of methyl vinyl ether were charged to a nitrogen pressure bomb. The mixture and the methyl vinyl ether are charged to the autoclave simultaneously through separate inlet funnels over a period of 4 hours while the temperature of the contents of the reactor is maintained at a temperature of 280° F. and at a pressure of 150 p.s.i.g. Prior to and during the addition of the reactants to the autoclave, gaseous nitrogen is continuously sparged through the reactor. The contents of the reaction vessel are maintained under continuous agitation and nitrogen blanket for 16 additional hours after which time substantially all of the styrene, methacrylonitrile, and methyl vinyl ether have polymerized, and the contents of the autoclave consist of a dispersion of approximately 1,000 grams of a linear polymer having a saturated ester-free backbone which contains methoxy (e.g., methyl ether groups) pendant from and external to the linear backbone. When a portion of the sample is withdrawn and the average molecular weight is determined using gel phase chromatographic techniques, the polymer has an average molecular weight of about 50,000. The temperature of the contents of the reaction vessel is decreased to 180° F. and the pressure decreased to 50 p.s.i.g. and thereafter, 2,072 grams of hydroxyethyl acrylate containing 0.02 weight percent of hydroquinone and 20 grams of boron trifluoride are added over a period of 60 minutes while agitation and heating are continued. Heating and agitation are continued for an additional 90 minutes until a portion of the hydroxyethyl acrylate has undergone transetherification with the pendant methoxy groups and the remainder of the hydroxyethyl acrylate has etherified with the glycidol to form the corresponding ether. The polymer formed by the transetherification reaction is that described in example 1, but the diluent is now a copolymerizable monomer consisting of the reaction product of the hydroxyethyl acrylate and the glycidol. The methyl alcohol which is formed during the transetherification reaction is then stripped from the liquid dispersion. The product so produced is a linear saturated ester-free backbone having pendant therefrom through ether linkage a plurality of ethylenically unsaturated groups (e.g., ethyl acrylate groups) and can be stored as prepared. Optionally, this product can be further reduced by adding styrene containing 0.015 weight percent of hydroquinone. Ether polymer compositions (e.g., one which does not contain styrene as a polymerizable monomer or the one which contains it) are formed into thermoset cured films by the addition of 1 percent benzoyl peroxide to a portion of the composition and which are poured between glass plates. The films are set aside for further evaluation as described in example 10.

EXAMPLE 8

Example 8 illustrates a thermosettable resin composition where the ethylenically unsaturated groups are attached to the polymer backbone through amine linkage and the polymer is dispersed in an ethylenically unsaturated amine.

To a 1-gallon pressure autoclave equipped with a thermometer, a gas inlet valve, heating and cooling coils, mechanical agitator, and inlet funnels for introducing inert gas and reactants, there is added 1,000 grams of n-butylamine. In a separate container, there is mixed 800 grams of styrene, 100 grams of acrylonitrile, 100 grams of methacryllyl amine and 10 grams of lauroyl peroxide. This mixture is charged into the reactor over a period of 4 hours under continuous agitation and nitrogen sparge while the contents of the reactor are maintained at 150° F. Thereafter, the contents of the reaction vessel are held at this temperature for an additional 12 hours until the polymerization reaction is completed. A portion of the sample is withdrawn and the average molecular weight, determined by gel phase chromatographic techniques, is found to be 55,000. The polymer is a linear saturated ester-free terpolymer having pendant amine groups.

The temperature of the contents of the reaction vessel is decreased to 78° F. and thereafter, while nitrogen sparge and agitation are continued, 2,818 grams of glycidyl methacrylate containing 0.015 weight percent of hydroquinone are added to the reactor over a period of about 3 hours while the contents of the reaction vessel are maintained at 78°±2° F.

The resultant product is a thermosettable liquid consisting of a linear polymer which is unsaturated by virtue of a plurality of ethylenically unsaturated groups pendant from the backbone and a copolymerizable monomer (e.g., an n-butyl dimethacryllyl amine) wherein the copolymerizable vinyl monomer has been produced in situ during the preparation of the linear polymer. If desirable, styrene may be additionally added although the polymer product as prepared can be polymerized to prepare cured films using the procedure described in example 1. Cured films so prepared are evaluated as in example 10.

EXAMPLE 9

Example 9 illustrates a thermosettable resin composition where the ethylenically unsaturated groups are attached to the polymer backbone through amide linkage and the polymer is disposed in an ethylenically unsaturated amide.

To the reaction vessel described in example 1, there is added 1,000 grams of formamide. In a separate container, there is mixed, under a blanket of nitrogen, 800 grams of styrene, 100 grams of methacrylonitrile, 100 grams of acrylamide, and 10 grams of benzoyl peroxide. The mixture is charged into the reactor over a period of 4 hours under continuous agitation and nitrogen sparge while the contents of the reactor are maintained at 280° F. The temperature, agitation, and nitrogen sparge are maintained in the reactor for an additional 12 hours until polymerization is completed. Thereafter, a portion of the sample is withdrawn, and the average molecular weight, determined by gel phase chromatography, is found to be 29,000. The polymer is a substantially linear saturated ester-free terpolymer having pendant amide groups.

The temperature of the contents of the reaction vessel is then decreased to 240° F. and while nitrogen sparge and agitation are continued, 1,652 grams of crotonaldehyde and 16.5 grams of sulfuric acid catalyst are added over a period of 90 minutes. The reactor is held under these conditions until the crotonaldehyde has reacted with the amide group of the ester-free saturated linear backbone and the amide groups of the formamide diluent to form a polymer composition having pendant crotonaldehyde resides dispersed in the ethylenically unsaturated crotonaldehyde formamide, the latter product being the copolymerizable monomer which was formed in situ simultaneously with the pendancy of the crotonaldehyde residues onto the polymer backbone. Cross-linked films were prepared using the procedure described in example 1 and were set aside for evaluation as described in example 8.

EXAMPLE 10

Cured films prepared from the products of examples 1 through 9 were tested for chemical resistance and compared with two commercially produced polyester resins. The films were weighed prior to and after immersion in 3.0 N nitric acid, 1.0 normal sodium hydroxide, methyl ethyl ketone, and benzene for 24 hours. In every instance, loss of weight of the cured films of examples 1 through 9 was significantly less than cured commercial polyester films which had been accorded the same treatment.

The thermosettable resin compositions of this invention are conventionally cured under conditions of free radical catalysis. They are useful in making fiber glass-reinforced plastic products, and such products usually require less fiber glass. The compositions can be employed to form low-density foamed plastic products and such products can be conventionally obtained by curing the compositions in the presence of a blowing agent.

This application contains subject matter related to that contained in five copending U.S. Pat. application Ser. Nos. 798,433, 798,458, 798,469, 798,470, and 798,769, filed simultaneously with the instant application and assigned to the same assignee.

What is claimed is:

1. The process of preparing a thermosettable resin composition comprising from about 35 to about 60 weight percent of a linear copolymer consisting of a saturated ester-free backbone having pendant therefrom through chemically functional linkage F, where F is selected from the group consisting of residues of ester, ether, isocyanate, amine, and amide, a plurality of $\alpha,\beta$-mono ethylenically unsaturated groups polymerizable with vinyl monomer for thermosetting purposes and from about 65 to about 40 weight percent of a copolymerizable $\alpha,\beta$-mono ethylenically unsaturated liquid monomer containing residues of a compound having chemical functionality F', where F' is selected from the group consisting of saturated esters, ethers, isocyanates, amines, and amides, wherein F and F' are identical residues, which comprise the steps of:

A. forming a reaction mixture consisting of from about 15 to about 60 weight percent, basis the weight of the composition, of a liquid organic diluent selected from the class consisting of
  1. alcohols, oxiranes, ethers, carboxylic acids, carboxylic acid anhydrides, isocyanates, amines, and amides
  2. from about 40 to about 90 weight percent, basis the weight of the polymer backbone, of at least one monomer selected from the group consisting of
    a. $\alpha,\beta$-mono ethylenically unsaturated substituted and unsubstituted hydrocarbons,
    b. $\alpha,\beta$-mono ethylenically unsaturated esters of organic and inorganic acids,
    c. halides of $\alpha,\beta$-mono ethylenically unsaturated compounds containing no additional functional groups.
    d. $\alpha,\beta$-mono ethylenically unsaturated nitriles, and
  3. from about 60 to about 10 weight percent, basis the weight of the polymer backbone, of a monomer selected from the group consisting of
    a. an $\alpha,\beta$-mono ethylenically unsaturated hydroxyl-substituted compound,
    b. an $\alpha,\beta$-mono ethylenically unsaturated oxirane,
    c. $\alpha,\beta$-mono ethylenically unsaturated ether,
    d. an $\alpha,\beta$-mono ethylenically unsaturated mono isocyanate,
    e. an $\alpha,\beta$-mono ethylenically unsaturated primary or secondary amine,
    f. an $\alpha,\beta$-mono ethylenically unsaturated amide and an $\alpha,\beta$-mono ethylenically unsaturated carboxylic acid, wherein the ethylenically unsaturated monomer has identical chemical functionality with the functional groups of the liquid organic diluent;

4. a free radical catalyst, a. heating said mixture, with agitation, in an inert atmosphere for a time sufficient to form a linear saturated ester-free addition polymer containing polar mono functionality pendant from said backbone, said mono functionality being selected from the class consisting of hydroxyl, carboxyl, ether, oxirane, isocyanate, amine, and amide functionality, said saturated organic diluent having identical substituent mono functionality to the functionality pendant from said backbone;

b. adding to the dispersion so formed an amount sufficient to react with substantially all of the substituent functionality pendant from the backbone and with identical functional substituent of the saturated organic diluent, compounds; when said backbone contains hydroxyl functionality, an $\alpha,\beta$-mono ethylenically unsaturated monomer selected from the class consisting of carboxylic acid anhydrides, ethylenically unsaturated isocyanates, and ethylenically unsaturated oxirane compounds;

ii. when said backbone contains oxirane functionality, an $\alpha,\beta$-mono ethlenically unsaturated monomer selected from the group consisting of a hydroxy compound, carboxylic acid, amine amide, and carboxylic acid anhydride;

iii. when said backbone contains ethereal functionality, a hydroxy-substituted $\alpha,\beta$-mono ethylenically unsaturated monomer;

c iv. when said backbone contains amine functionality, an $\alpha,\beta$-mono ethylenically unsaturated monomer selected from the group consisting of isocyanate, a hydroxyl compound and an oxirane;

v. when said backbone contains amide functionality, an $\alpha,\beta$-mono ethylenically unsaturated monomer selected from the group consisting of an aldehyde and oxirane;

thereby forming a mixture comprising said saturated organic diluent and said unsaturated monomer c. heating the resultant mixture at a temperature and for a time sufficient to form a linear copolymer having a substantially inert backbone and having pendant therefrom a plurality of mono ethylenically unsaturated groups, the linear polymer being dispersed in a copolymerizable $\alpha,\beta$-mono ethylenically unsaturated liquid monomer having the same functional linkage as that of the linkage of the plurality of ethylenically unsaturated groups pendant from the linear polymer backbone.

2. The process of claim 1 wherein the saturated liquid organic diluent is an oxirane and the ethylenically unsaturated functional monomer polymerized in said backbone is an ethylenically unsaturated oxirane and the functional linkage through which the plurality of ethylenically unsaturated groups are pendant from the backbone is an ether and the liquid copolymerizable monomer is an $\alpha,\beta$-mono ethylenically unsaturated ether.

3. The process of claim 2 wherein the saturated liquid organic diluent is an alcohol and the ethylenically unsaturated functional monomer polymerized in said backbone is an ethylenically unsaturated hydroxyl-substituted monomer and the functional linkage through which the plurality of ethylenically unsaturated groups are pendant from the backbone is an ester and the liquid copolymerizable monomer is an $\alpha,\beta$-ethylenically unsaturated ester.

4. The process of claim 1 wherein the saturated organic diluent is a primary or secondary amine, the ethylenically unsaturated functional monomer polymerized in said backbone is an ethylenically unsaturated primary or secondary amine, and the functional linkage through which the plurality of ethylenically unsaturated groups are pendant from the backbone amine and the liquid copolymerizable monomer is an $\alpha,\beta$-ethylenically unsaturated amine.

5. The process of claim 1 wherein the saturated organic liquid diluent is an amide and the ethylenically unsaturated functional monomer polymerized in said backbone is an ethylenically unsaturated amide and the functional linkage through which the plurality of ethylenically unsaturated groups are pendant from said backbone is amide and the liquid copolymerizable $\alpha,\beta$-mono ethylenically unsaturated amide.

6. A thermosettable resin composition comprising from about 35 to about 60 weight percent of a linear copolymer consisting of a saturated ester-free backbone having pendant therefrom through chemically functional linkage F, where F is selected from the group consisting of residues of, ether, isocyanate, amine and amide, a plurality of $\alpha,\beta$-mono ethylenically unsaturated groups polymerizable with vinyl monomer for thermosetting purposes and from about 65 to about 40 weight percent of a copolymerizable -mono ethylenically unsaturated liquid monomer containing residues of a compound having chemical functionality F', where F' is selected from the group consisting of saturated ethers, isocyanates amines, and amides, wherein F and F' are identical residues, which is prepared by A. forming a reaction mixture consisting of from about 15 to about 60 weight percent, basis the weight of the composition, of a liquid organic diluent selected from the class consisting of 1. alcohols, oxiranes, ethers, isocyanates, amines, and amides 2. from about 40 to about 90 weight percent, basis the weight of the polymer backbone, of at least one monomer selected from the group consisting of a. $\alpha,\beta$-mono ethylenically unsaturated substituted and unsubstituted hydrocarbons, b. $\alpha,\beta$-mono ethylenically unsaturated esters or organic and inorganic acids, c. halides of $\alpha,\beta$-mono ethylenically unsaturated compounds containing no additional functional groups d. $\alpha,\beta$-mono ethylenically unsaturated nitriles, and 3. from about 60 to about 10 weight percent, basis the weight of the polymer backbone, of a monomer selected from the group consisting of a. and $\alpha,\beta$-mono ethylenically unsaturated hydroxyl-substituted compound, b. an $\alpha,\beta$-mono ethylenically unsaturated oxirane, c. an $\alpha,\beta$-mono ethylenically unsaturated ether, d. an $\alpha,\beta$-mono ethylenically unsaturated mono isocyanate, e. an $\alpha,\beta$-mono ethylenically unsaturated primary or secondary amine, and f. an $\alpha,\beta$-mono ethylencially unsaturated amine, wherein the ethylenically unsaturated monomer has identical chemical functionality with the functional groups of the liquid organic diluent;

4. a free radical catalyst a. heating said mixture, with agitation, in an inert atmosphere for a time sufficient to form a linear saturated ester-free addition polymer containing polar mono functionality pendant from said backbone, said mono functionality being selected from the class consisting of hydroxyl, ether, oxirane isocyanate, amine, and amide functionality, said saturated organic diluent having identical substituent mono functionality to the functionality pendant from said backbone;

b. adding to the dispersion so formed an amount sufficient to react with substantially all of the substituent functionality pendant from the backbone and with the identical functional substituent of the saturated organic diluent i. when said backbone contains hydroxyl functionality, an $\alpha,\beta$-mono ethylenically unsaturated monomer selected from the class consisting of ethylenically unsaturated isocyanates, and ethylenically unsaturated oxirane compounds.
ii. when said backbone contains oxirane functionality, an $\alpha,\beta$-mono ethylenically unsaturated monomer selected from the group consisting of a hydroxy compound, amine, and amide,
iii. when said backbone contains ethereal functionality, a hydroxy-substituted $\alpha,\beta$-mono ethylenically unsaturated monomer
iv. when said backbone contains amine functionality, an $\alpha,\beta$-mono ethylenically unsaturated monomer selected from the group consisting of isocyanate, a hydroxyl compound and an oxirane,
v. when said backbone contains amide functionality, an $\alpha,\beta$-mono ethylenically unsaturated monomer selected from the group consisting of an aldehyde and oxirane;

thereby forming a mixture comprising said saturated organic diluent and said unsaturated monomer c. heating the resultant mixture at a temperature and for a time sufficient to form a linear copolymer having a substantially inert backbone and having pendant therefrom a plurality of mono ethylenically unsaturated groups, the linear polymer being dispersed in a copolymerizable $\alpha,\beta$-mono ethylenically unsaturated liquid monomer having the same functional linkage as that of the linkage of the plurality of ethylenically unsaturated groups pendant from the linear polymer backbone.